United States Patent [19]
Oda

[11] 4,021,256
[45] May 3, 1977

[54] IMPREGNANT

[75] Inventor: Masamitsu Oda, Hiroshima, Japan

[73] Assignee: Toyo Kogyo Co., Ltd., Japan

[22] Filed: Jan. 29, 1976

[21] Appl. No.: 653,628

[30] Foreign Application Priority Data

Feb. 14, 1975  Japan .............................. 50-19068

[52] U.S. Cl. .................................. 106/74; 106/84; 106/287 S
[51] Int. Cl.² .......................................... C09D 1/02
[58] Field of Search ............... 106/38.22, 38.35, 74, 106/84, 287 S; 174/120 C; 428/540

[56] References Cited

UNITED STATES PATENTS

| 2,926,098 | 2/1960 | Ilenda et al. .................... 106/38.35 |
| 3,356,515 | 12/1967 | McGlothlin ........................ 106/84 |
| 3,459,500 | 8/1969 | Segura et al. ...................... 423/332 |

*Primary Examiner*—Lorenzo B. Hayes
*Attorney, Agent, or Firm*—Wenderoth, Lind & Ponack

[57] ABSTRACT

Impregnant including surfactant to an amount to bring the surface tension of the impregnant to a value which permits impregnation of a part by the impregnant to be effected under conditions of normal pressure and temperature, whereby the impregnation process is simple and expensive equipment is unnecessary.

7 Claims, No Drawings

IMPREGNANT

The present invention relates to impregnant suited for filling pin-holes, shrinkage cavities, cold shut or similar defects liable to occur in metal castings, for filling pores of sintered parts, by way of pretreatment of such parts prior to plating or gas soft nitriding thereof, or for filling pores of cast metal or sintered parts which are required to prevent leakage of a fluid. More particularly the invention relates to water glass impregnant for the above purposes.

Water glass impregnants are widely employed and are preferred impregnants for many purposes, since as well as achieving desired results they may be removed by a water-wash effected subsequently to the impregnation process, and also they have excellent heat resistance. An example of the composition of a commonly employed, representative conventional water glass impregnant is as shown in Table 1 below. The values noted in Table 1 indicate percent by weight of the various components.

Table 1

| | | | |
|---|---|---|---|
| $SiO_2$ | 30.80 % | CuO | 0.01 |
| $Na_2O$ | 9.19 | $Fe_2O_3$ | 0.08 |
| $H_2O$ | 57.30 | $MnO_2$ | 0.03 |
| MgO | 0.15 | other components | 2.37 |
| $Al_2O_3$ | 0.07 | | |

It may be seen from Table 1 that a conventional water glass impregnant contains a comparatively high proportion of sodium oxide ($Na_2O$). Because of this, such impregnant has poor resistance to water when cured. In addition, although subsequent removal of the impregnant from a treated part by water wash is possible, this process is not always easy. There is another disadvantage in that the process of curing is frequently accompanied by excessive contraction of the impregnant with the result that, particularly in cast iron products, there is liable to be formation of continuous fine spaces. This makes the effective renewal of the products to be treated difficult and generally can only be partially achieved.

To overcome such disadvantages associated with conventional impregnants, the present applicant has proposed a water glass impregnant which is disclosed in Japanese Patent Laid Open Publication No. 50-119725 and has the general composition 23-24% $SiO_2$, 4.5-6.0% $Na_2O$, 0.20-0.22% $Li_2O$, and 0.5-1.0% glycerol, the remainder being water. The disclosed impregnant has the advantages that the impregnant may be removed more easily by water wash, and remains effective for a longer time. Also improved renewal rates are achieved, since there is reduced contraction of the impregnant during curing.

However, while having these advantages, the disclosed impregnant has drawbacks with respect to the associated equipment necessary for effecting the impregnation process. In order to fill pores of a cast or sintered part, or other product to be impregnated, it is necessary to provide a special vacuum unit and autoclave or similar means for application of pressure, in which first air is expelled from the pores and then the impregnant is forced into the pores under pressure. Because this special equipment must be employed, the cost of necessary capital investment to permit use of the disclosed impregnant is high, and the impregnant can not yet be said to present full advantages in terms of industrial use thereof.

It is accordingly a principal object of the present invention to provide an improved impregnant.

It is a further object of the invention to provide an impregnant which fulfills requisite functions for a long duration, is easily removable by washing and brings a high renewal rate. This impregnant does not require special, expensive equipment or necessitate special conditions during impregnation thereof into a part, and may be impregnated into a part under normal temperature and pressure conditions.

In achieving these and other objects, there is provided according to the present invention an impregnant which includes therein an addition of a surfactant, whereby surface tension of the impregnant in liquid form is lowered and impregnation thereof into a part is easier. More specifically an impregnant according to the invention contains 23-24% by weight $SiO_2$, 4.5-6.0% by weight $Na_2O$, 0.20-0.22% by weight $Li_2O$, 0.5-1.0% by weight glycerol and an anionic surfactant present in the range 0.01-2.0% by weight, the remainder being water.

These percentages, and other component percentages noted below refer to proportions of components in an impregnant as initially prepared, i.e., prior to introduction of the impregnant into a part, and to curing or other form of hardening or other subsequent treatment of the impregnant. Also, for brevity, in the description below proportions of components of an impregnant are simply noted as percentage values, it being understood that these values refer to percentage composition by weight.

The reasons for maintaining the above-noted component percentage ranges in the impregnant of the invention are set forth below.

$SiO_2$ constitutes the principal component in the solid impregnant resulting from curing of the impregnant initially introduced in liquid form into a part, and should be in the range 23-24%. It has been found that if there is less than 23% $SiO_2$, resistance of the impregnant to water is unduly lowered, while if more than 24% $SiO_2$ is present viscosity of the impregnant rises, making it difficult to ensure efficient impregnation of the impregnant into all pores or other voids required to be filled in a part. Also, more than 24% $SiO_2$ tends to result in instability of silicic acid sol in the impregnant, and precipitation of $SiO_2$ when the impregnant is stored for a long time.

It will be noted that the proportion of $Na_2O$, 4.5-6.0%, is lower than in a conventional water glass impregnant. It has been found that if the proportion of $Na_2O$ is less than 4.5% there is less satisfactory adhesion of the impregnant to an impregnated part. If the proportion is higher than 6%, resistance of the impregnant to water is lowered and removal of the impregnant by water-wash becomes difficult. In addition to this, an impregnant with more than 6% $Na_2O$ tends to contract to a large degree during the curing process and so form continuous five spaces.

$Li_2O$ acts as a stabilizer of silicic acid sol in the impregnant and also serves to improve resistance to water in the cured impregnant, only 0.20-0.22% $Li_2O$ being necessary to achieve this. However, with less than 0.20% $Li_2O$ in the impregnant, silicic acid sol becomes unstable, and with more than 0.22% resistance to water is lowered.

Glycerol, provided in the range 0.5-1.0%, is included in order to prevent dehydration of the impregnant prior to use thereof, and to prevent cracking after curing. Less than 0.5% glycerol results in cracking in the cured impregnant, while more than 1.0% results in lowered water resistance of the cured impregnant and less adhesion to an impregnated part.

As noted above, a surfactant is included to lower surface tension of the impregnant and so facilitate impregnation thereof into pores of a part. Suitable surfactants to achieve this are anionic surfactants. Taking a representative classification of surfactants to be anionic, cationic, and non-ionic surfactants, it was found that the use of surfactants other than anionic surfactants did not achieve the required results in the impregnant of the invention. Preferred, but non-limiting examples of surfactants which are suitable for employment include sodium sulfate ester of castor oil, sodium alkyl aryl sulfonate, sodium sulfate ester of a higher fatty acid, sodium alkyl naphthalene sulfonate, sodium sulfate ester derived from lauryl alcohol, or a sodium hydrogen sulfite addition product of ester of anhydrous maleic acid and higher alcohol. Of these substances, particularly good results are achieved by use of sodium alkyl aryl sulfonate.

When impregnation is effected under conditions of normal pressure temperature, the optimum amount of surfactant to be added in order to ensure that the impregnant is moved in a required manner into the pores of a part obviously depends on pore size. If a part to be impregnated is a sintered part or ferrous or aluminium casting, in which pore size does not generally exceed 100 $\mu$, the amount of surfactant added should be such as to bring surface tension of the impregnant at room temperature to 45 dyne/cm or slightly less. Surface tension of the impregnant of the invention is brought to such a value by making a 0.01-2.0% addition of surfactant, as noted above. If an amount less than, 0.01% is the surfactant is overdiluted and has little effect in lowering surface tension of the impregnant. An addition of more than 2.0% is undesirable, since such an addition causes critical micelle concentration of the impregnant to be reached, with the result is that there is no further lowering of surface tension. There is also the adverse effect that curing cannot be effected satisfactorily, and that the cured impregnant is serviceable for a shorter time.

The exact amount of an anionic surfactant to be added of course also depends on the precise type of surfactant employed. In general, the more carbon atoms a surfactant contains, the less the amount of surfactant added is, since increased carbon content results in critical micelle concentration of the impregnant being reached earlier, and does not permit lowering of surface tension below a certain value. However, all of the surfactants noted above as being suitable for employment according to the invention achieve required results if added to an amount not exceeding 2.0%.

Water, which constitutes the balance of the impregnant composition, serves principally to modify viscosity of the impregnant.

Stability of the impregnant and effectiveness of the impregnation process can be further improved by addition of a dispersant, which should be insoluble in water and should have properties such that it is not liable to cause gelling even if brought into contact with silicic acid sol. Examples of suitable dispersants having such properties include metal oxides such as $Fe_2O_3$ or $Al_2O_3$, and talc or other minerals. If employed, a dispersant should have a particle size in the range 0.5-2.0 microns, and the amount thereof added should be in the range 0.5-2.0%. Additions smaller than 0.5% make little or no contribution to efficiency of pore-filling by the impregnant, while addition of a dispersant in excess of 2.0% tends to provoke precipitation, making it difficult to maintain an evenly distributed composition.

Description of the invention will continue below in reference to several specific examples thereof.

EXAMPLE 1

Drop-wise addition of water glass and lithium silicate was made to a silicic acid sol, which was agitated while this addition was made. A further addition of glycerol was made, and the whole was agitated to thoroughly mix the components, whereby there was obtained a conventional impregnant A constituted by 24.0% $SiO_2$, 4.9% $Na_2O$, 0.2% $Li_2O$, 0.68% glycerol, and a balance of water. Impregnant A was employed as such in tests described below, and also served in preparation of an impregnant B, which was produced by further adding to the above described composition sodium palmityl benzene sulfonate, which is a type of sodium alkyl aryl sulfonate. The amount of this further addition was such that impregnant B included 24.0% $SiO_2$, 4.9% $Na_2O$, 0.2% $Li_2O$, 0.68% glycerol, and 0.1% sodium palmityl benzene sulfonate, the remainder being water.

There were also prepared 10 test pieces each constituted by a tubular sintered part having an internal diameter of 14 mm, external diameter of 23 mm, and length of 14mm. Composition of each of the sintered parts was 1% C, 2% Cu, with Fe making up the remainder, porosity thereof was 20%, and average pore size therein was 70 $\mu$. Previous testing of the parts showed that prior to impregnation of the parts application of pneumatic pressure of 2 kg/cm² caused a leakage rate of 6,000 ml/min.

Five of these parts were impregnated with impregnant A and five with impregnant B, procedure in each impregnation process being as follows. The parts were immersed in the impregnant, A or B, for 30 minutes, under conditions of normal pressure and temperature, then removed and washed in water, after which the parts were heated to 80° C and held at this temperature for 3 hours. The parts were subsequently tested in pairs consisting of one part impregnated with impregnant A and one part impregnated with impregnant B. In each case the test consisted of applying pneumatic pressure of 2 kg/cm² for 1 minute and measuring the rate of leakage permitted by parts during this time. Results of the tests are shown in Table 2 below, successive tests of successive pairs of parts being numbered 1 through 5.

Table 2

| Test | Impregnant A (conventional product) | Impregnant B (product according to the invention) |
|---|---|---|
| 1 | 400 ml/min | 0 ml/min |
| 2 | 350 ml/min | 0 ml/min |
| 3 | 350 ml/min | 0 ml/min |
| 4 | 300 ml/min | 0 ml/min |
| 5 | 450 ml/min | 0 ml/min |

EXAMPLE 2

Impregnants A and B prepared in the manner described in Example 1 above were each employed for impregnation of five inlet manifold elements such as employed in association with a 1300 cc engine, the elements being aluminium castings with the following compositions: Si=4–5%; Cu=3.5–4.5 %; Zn ≦ 1.0%; Fe ≦ 0.8%; Mg ≦ 0.2%; $MnO_2$ ≦ 0.5%; the remainder being Al. Prior to impregnation of the elements, the rate of leakage permitted thereby was 500–700 ml/min under application of pneumatic pressure of 5 kg/cm². The impregnation process in each case was as follows. The inlet manifold element was immersed in the impregnant, A or B, and kept immersed for 30 minutes, under conditions of normal pressure and temperature, after which the part was removed, heated to 80° C, and held at this temperature for 2 hours. The impregnated inlet manifold elements were then tested in pairs, as in Example 1, to determine leakage rates, pressure applied in all cases being 5kg/cm², and pressure being maintained for 1 minute. Test results are shown in Table 3 following.

Table 3

| Test | Impregnant A (conventional product) | Impregnant B (product according to the invention) |
|---|---|---|
| 1 | 480 ml/min | 0 ml/min |
| 2 | 500 ml/min | 0 ml/min |
| 3 | 250 ml/min | 0 ml/min |
| 4 | 330 ml/min | 0 ml/min |
| 5 | 200 ml/min | 0 ml/min |

From the test results shown in Table 2 and 3 relating to impregnants A and B each having surface tension of 58.8 dyne/cm and 40 dyne/cm, respectively, it is apparent that the impregnant according to the invention, impregnant B, permits effectively complete filling of pores of cast or sintered parts without there being required any special equipment for producing vacuum and elevated pressure. The impregnant of the invention thus permits impregnation of parts to be effected in a simple process requiring only inexpensive equipment.

The work of Example 3 was concerned principally with determining the effect of adding different amounts of surfactant to a particular preparation. The preparation employed was a mixture having the same composition as impregnant A employed in Examples 1 and 2, and this preparation was divided into nine portions, to each of which was added a different amount of surfactant in the form of sodium palmityl benzene sulfonate, the amounts of surfactant added being 0.005%, 0.008%, 0.01%, 0.1%, 0.5%, 1.0%, 2.0%, 3.0%, and 5.0%. The effect had on surface tension by these different additions is as shown in Table 4.

Table 4

| Amount added(%) | 0.005 | 0.008 | 0.01 | 0.1 | 0.5 | 1.0 | 2.0 | 3.0 | 5.0 |
|---|---|---|---|---|---|---|---|---|---|
| Surface tension (dyne/cm) | 52.5 | 48.5 | 45.0 | 40.3 | 39.0 | 38.5 | 38.5 | 38.5 | 38.5 |

As seen from the above table, addition of surfactant to an amount greater than 1.0% is of no particular advantage since critical micelle concentration is reached and there is no further lowering of surface tension. On the other hand, for an addition of only 0.005% surface tension remains high, with the result that aims of the invention are not achieved.

Impregnants including surfactants other than palmityl benzene sulfonate were prepared in the same manner as in Example 3, and it was found that although there was some variation in the range in which surfactant may be usefully added, results were generally the same as those of Example 3.

What is claimed is:

1. A water glass impregnant composition consisting essentially of $SiO_2$ in the range 23 to 24% by weight, $Na_2O$ in the range 4.5 to 6.0% by weight, $Li_2O$ in the range 0.20 to 0.22% by weight, glycerol in the range 0.5 to 1.0% by weight, and an organic anionic surfactant to lower the surface tension of the impregnant composition in the range of 0.01 to 2.0% by weight, the remainder of said composition being principally water.

2. A water glass impregnant as in claim 1 wherein said anionic surfactant is a sodium alkyl aryl sulfonate.

3. A water glass impregnant as in claim 2 wherein said sodium alkyl aryl sulfonate is sodium palmityl benzene sulfonate.

4. A water glass impregnant as in claim 1 which further includes a dispersant having a particle size in the range 0.5 to 2.0 microns, in the range 0.5 to 2.0% by weight.

5. A water glass impregnant as in claim 4 wherein said dispersant is composed principally of a metal oxide.

6. A water glass impregnant as in claim 5 wherein said metal oxide is $Fe_2O_3$ or $Al_2O_3$.

7. A water glass impregnant as in claim 1, wherein the organic anionic surfactant is selected from the group consisting of a sodium sulfate ester of castor oil, a sodium alkyl aryl sulfonate, a sodium sulfate ester of a higher fatty acid, a sodium alkyl naphthalene sulfonate, a sodium sulfate ester derived from lauryl alcohol, and a sodium hydrogen sulfite addition product of an ester of anhydrous maleic acid and higher alcohol.

* * * * *